United States Patent [19]
Spector

[11] Patent Number: 5,812,099
[45] Date of Patent: Sep. 22, 1998

[54] PORTABLE AUDIO-VISUAL VIRTUAL-REALITY SYSTEM

[76] Inventor: Donald Spector, 380 Mountain Rd., Union City, N.J. 07087

[21] Appl. No.: 48,109

[22] Filed: Apr. 15, 1993

[51] Int. Cl.[6] ...................................................... G01G 5/00
[52] U.S. Cl. .................................................. 345/8; 353/19
[58] Field of Search ................................... 353/108, 110, 353/112, 15, 19; 345/8, 7, 9; 359/630, 631, 13, 14

[56] References Cited

U.S. PATENT DOCUMENTS

| | | | |
|---|---|---|---|
| 3,528,734 | 9/1970 | Bruel et al. | 353/15 |
| 3,809,364 | 5/1974 | Redemann | 353/15 |
| 3,851,116 | 11/1974 | Cannon | 179/100.25 |
| 3,963,335 | 6/1976 | Horvath | 353/15 |
| 4,257,068 | 3/1981 | Meredith | 345/8 |
| 4,277,152 | 7/1981 | Taylor | 352/17 |
| 4,636,866 | 1/1987 | Hattori | 345/8 |
| 5,003,300 | 3/1991 | Wells | 345/8 |

Primary Examiner—Dennis-Doon Chow
Attorney, Agent, or Firm—Michael Ebert

[57] ABSTRACT

An audio-visual, virtual-reality system making it possible for a user to see, during successive time periods, a still image of a particular subject while listening to a program relating to that subject. The system consists of a standard record player coupled to a viewer unit, the record player being provided with a loud speaker and an output jack to both of which are fed the reproduced signals of the recording being played. The record carries a sound recording of a series of programs, each related to a different subject, each program being preceded by a supersonic cue signal. Inserted in the viewer unit is a film storage device containing a series of film frames, each having an image of a subject corresponding to a respective program of the recording. The unit includes a stepping motor to advance the frames so as to present them successively to the eyes of the user, and a control circuit for the motor responsive to cue signals yielded at the output jack of the player. The motor is activated each time a cue signal is received to present the next frame in the series. The arrangement is such that when a particular program is heard by the user, he is at the same time viewing the image of the subject to which this program is related.

3 Claims, 3 Drawing Sheets

PORTABLE AUDIO-VISUAL VIRTUAL-REALITY SYSTEM

BACKGROUND OF THE INVENTION

1. Field of Invention

This invention relates generally to audio-visual systems adapted to present to a user a still film image of a particular subject while the user listens to an audio program related to this subject, and more particularly to a portable virtualreality system consisting of a standard record player for playing a record whose recording is constituted by a series of different program, and a viewer unit which covers the eyes of the user and successively presents to the eyes a series of still film images of different subjects so that when the user views an image of particular subject, he then hears the program related thereto.

2. Status of Prior Art

It is common to use audio-visual systems as a teaching aid, for business presentations and for entertainment purposes so that as an audience views a film frame projected onto a screen, it hears at the same time a recorded audio program related to the subject material of the visual image projected on the screen.

In order to synchronize the visual image being presented with the audio program, the Brucat U.S. Pat. No. 4,053,214 and the Taylor U.S. Pat. No. 4,277,152 disclose arrangement in which cue signals are recorded on the record carrying the programs. These cue signals are detected and serve to actuate a relay or other switching means to apply power to the motor of the film projector and thereby advance the film to the next image frame to be projected.

The Bruel et al. U.S. Pat. No. 3,528,734 discloses a portable audio-visual playback apparatus which has separate casings for the audio and visual portions. The audio portion plays a tape which has a sound recording on one side and a printed text on the other side. The sound recording is read by a read head and the printed text is optically transmitted for viewing from outside the casing. The portable device may be suspended from the neck of a user and the sound of the visual portion conducted to an earpiece while the text of the audio portion may be optically transmitted by fiber optics to eyeglasses of the user.

In the unit described in the Weitzner, et al. U.S. Pat. No. 3,389,636, an optical slide viewer is provided for viewing a slide having an audio recording track. When the slide is inserted in the viewer, a rotating magnetic head scans the track to play the recording as the slide is being viewed, the audio output being sent to a loud speaker.

Digital techniques are now widely used to make sound recordings. Thus when recording music or speech, the analog signal output of the microphone amplifier is sampled and converted into a stream of digital bits that are recorded on magnetic tape and then transferred from the tape to a rotating master disc. The recording on the master disc is in the form of microscopic indentations in a spiral track on one surface of the disc. The master disc is used to create stampers for pressing vinyl records, called compact discs or CD's. The player for the CD record uses a laser beam optical pick-up and makes no physical contact with the disc.

CD players are now available in highly compact portable form. Such players include a loud speaker and also an output jack to both of which are fed the audio signals from the recording being played. Thus, if one wishes to duplicate a particular CD record, one can plug a recorder into the output jack of the CD player, and as the CD record is being played, it is rerecorded by the recorder, for the output jack of the CD player may be used to feed the audio to a remote amplifier or to earphones.

As used herein, the term record player or audio record player refers to a player adapted to play an audio recording in a CD or other disc format or in a magnetic tape cassette or any other format.

SUMMARY OF INVENTION

The main object of this invention is to provide a portable, virtual-reality, audio-visual system making it possible for a user to see during successive time periods, a still image of a particular subject while listening to a sound program relating to the subject being viewed.

More particularly, an object of this invention is to provide a system of this type consisting of a standard audio-visual player for playing a record carrying a recording of a series of programs, each related to a different subject, and a viewer unit coupled to the player to present to the eyes of the user listening to the recording, a series of film frames, each having an image thereon of the subject to which the particular program being heard is related.

Also an object of the invention is to provide a system in which the stereophonic sounds are yielded by the player and stereoscopic images are produced by the viewer unit to enhance virtual reality effects.

While this invention will be described in connection with a standard CD record player, it is to be understood that it is operable with other forms of audio record players, such as those which play magnetic tape cassettes.

Still another object of the invention is to provide a system of the above type which is relatively inexpensive, for the system makes use of any existing portable CD player which is commercially available at low cost or which the user may already possess and it is only the viewer unit that is specially made.

Briefly stated, these objects are attained in an audio-visual virtual-reality system making it possible for a user to see, during successive time periods, a still image of a particular subject while listening to a program relating to the subject. The system consists of a standard record player coupled to a viewer unit, the record player being provided with a loud speaker and an output jack to both of which are fed the reproduced signals of the program being played. The record carries a recording of a series of programs, each related to a different subject, each program being preceded by a supersonic cue signal.

Inserted in the viewer unit is a film storage device containing a series of film frames, each having an image of a subject corresponding to a respective program of the recording. The unit includes a step motor to advance the frames so as to present them successively to the eyes of the user, and a control circuit for the motor responsive to cue signals yielded at the output jack of the player. The motor is activated each time a cue signal is received to present the next frame in the series. The arrangement is such that when a particular program is heard by the user, he is at the same time viewing the image of the subject to which this program is related.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Basic System

An audio-visual system in accordance with the invention consists of a standard record player coupled to a viewer unit, the record that is played carrying a recording of a series of programs, each related to a different subject. The viewer unit presents to the eyes of the user a series of still film image of the different subjects, so that when the user is viewing the image of a particular subject he is at the same time hearing the program related thereto.

We shall now by way of a simple example demonstrate how the system functions. In this example the system acts to tell a series of stories derived from the Old Testament on a level suitable for children. And as each story is being told, the listener sees a still image of the subject of the story.

The first story in the series is about Adam and Eve (program I), the second about Noah and his ark (program II); the third about Moses (program III); the fourth deals with King David (program IV), and so on. The programs may be of unequal length, but their number must be such that they can be recorded on a CD-sound recorder having a playing time of about one hour.

As the CD record is being played on a standard CD player and the user of the system hears program I, the viewer unit whose operation is synchronized with the CD player, then presents to the eyes of the user during the playing period of this program a still image of Adam and Eve. When program II is being played, the user sees a still image of Noah and his ark, and as the remaining programs are being played, the viewer then sees the images of the subjects to which these programs are related.

The images may be taken from classic paintings of Biblical figures, from illustrations included in children's books on Bible stories, or the images may be based on original artwork.

Or the series of film images may be that of different rock stars or rock bands, the recorded programs then being a musical performance by each of these stars or bands. Since the system has educational as well as entertainment value, the program possibilities are nearly boundless. The programs may deal with notable historic figures, eminent scientists and important artists and their works.

Thus with the system, the eyes and ears of the user are engaged, and excluded from the eyes are all stimuli other than the images, thereby putting in user in a virtual-reality environment.

First Embodiment

Figure 1:
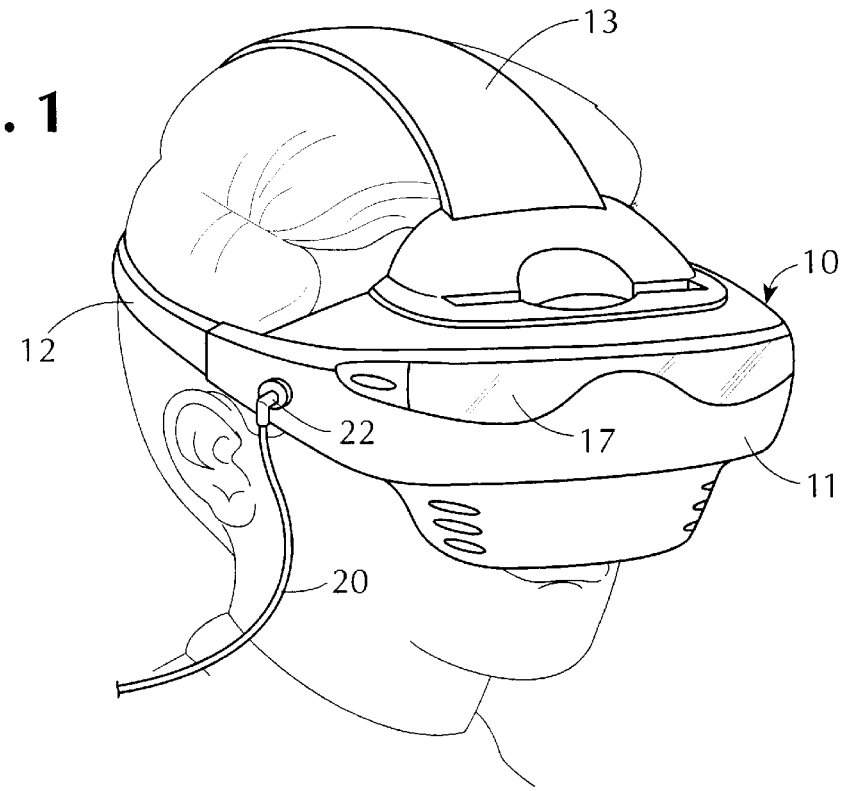
FIG. 1 illustrates one embodiment of a viewer unit of an audio-visual system in accordance with the invention.
Figure 2:
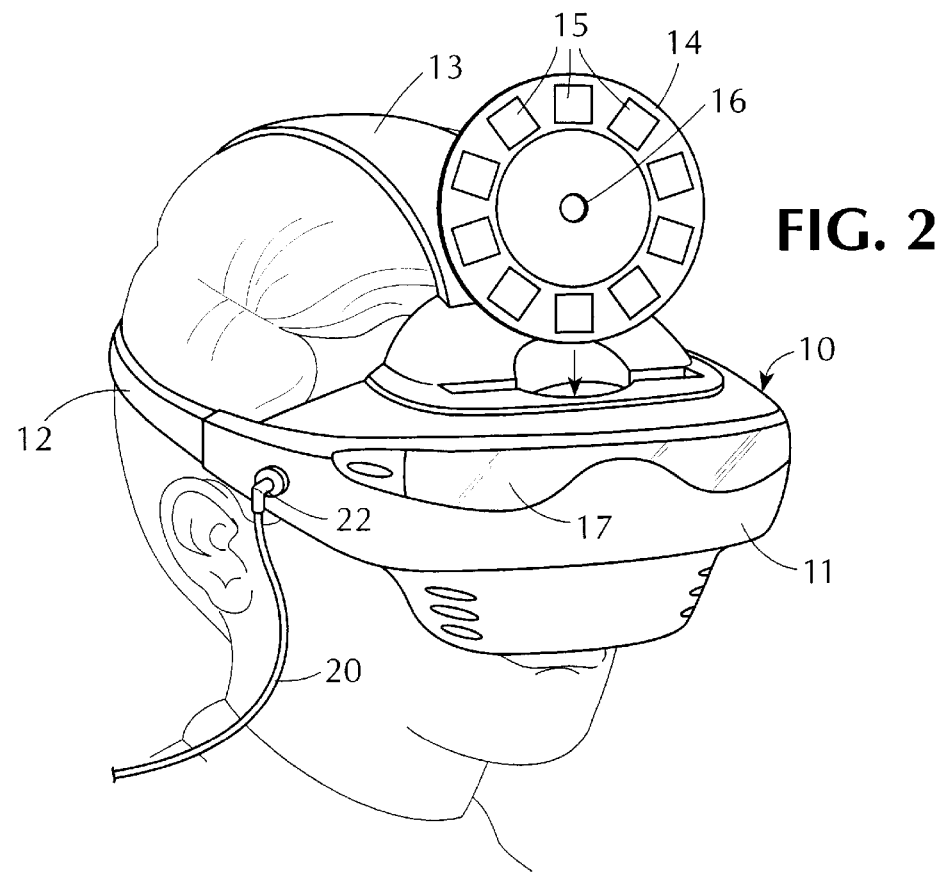
FIG. 2 shows a View Master type image disc being inserted into the mask portion of the viewer unit.

As shown in FIGS. 1 and 2, the viewer unit 10 of the system includes an arcuate mask section 11 that covers the eyes of the individual using the system. Mask section 11 is held in place by a strap 12 encircling the head of the user and joined to opposite ends of the mask section, and a second strap 13 that runs from the top of the mask section, at its midpoint, over the head to join strap 12 behind the head.

The viewer unit is adapted to receive a film storage device containing a series of film frames each carrying an image of a different subject. In the embodiment shown in FIGS. 1 and 2, this device takes the form of the well-known View Master image disc 14 which contains a circular array of film frames 15, the disc having a spindle hole 16 so that it can be driven by a stepping motor included within the viewing unit. In operation, only one frame at a time is presented to the eyes of the user through a pair of lenses which enlarge the image that is illuminated by ambient light passing through a window 17 on the front of the mask section. Or a battery-operated light source may be provided to illuminate the frames.

Figure 6:
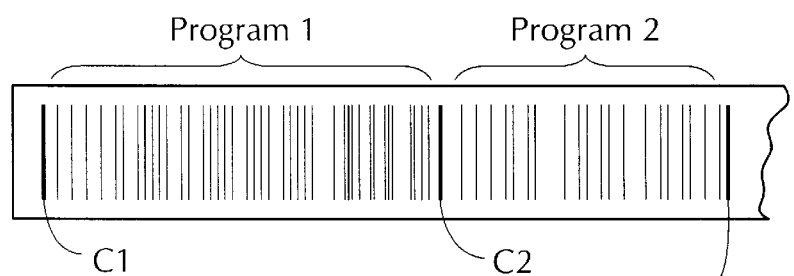
FIG. 6 schematically shows the track of the recording being played.

Associated with viewer unit 10 is a standard compact disc player 18 for playing CD records. In the system in accordance with the invention, the CD record has digitally recorded on its track, as shown schematically in FIG. 6, a series of programs (program 1, II etc.) each program being related to a respective image subject in the series of images carried by the film frame storage device 14. When played back, the digital recording is converted to audio signals which are reproduced by a loud speaker.

Preceding each program in the series thereof in the recording is a digital cue signal ($C_1$, $C_2$, $C_3$ etc.) which when played back yields in the output of the player an inaudible cue signal in the supersonic range which is inaudible, even though fed to the loud speaker. Thus, if the supersonic cue signal has a frequency of 25,000 Hz, it will not be heard by the user, for the upper limit of the human hearing range is between about 13,000 to 18,000 Hz, depending on the individual.

Figure 5:
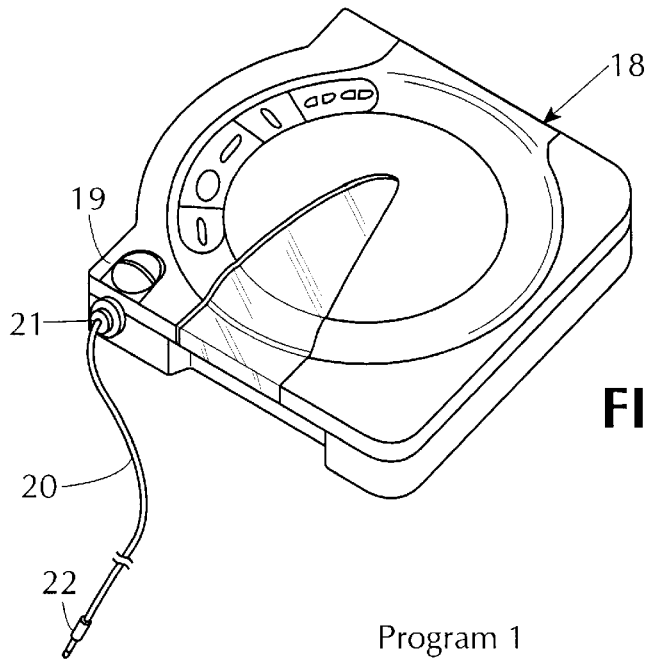
FIG. 5 illustrates the CD record player included in the system.
Figure 7:
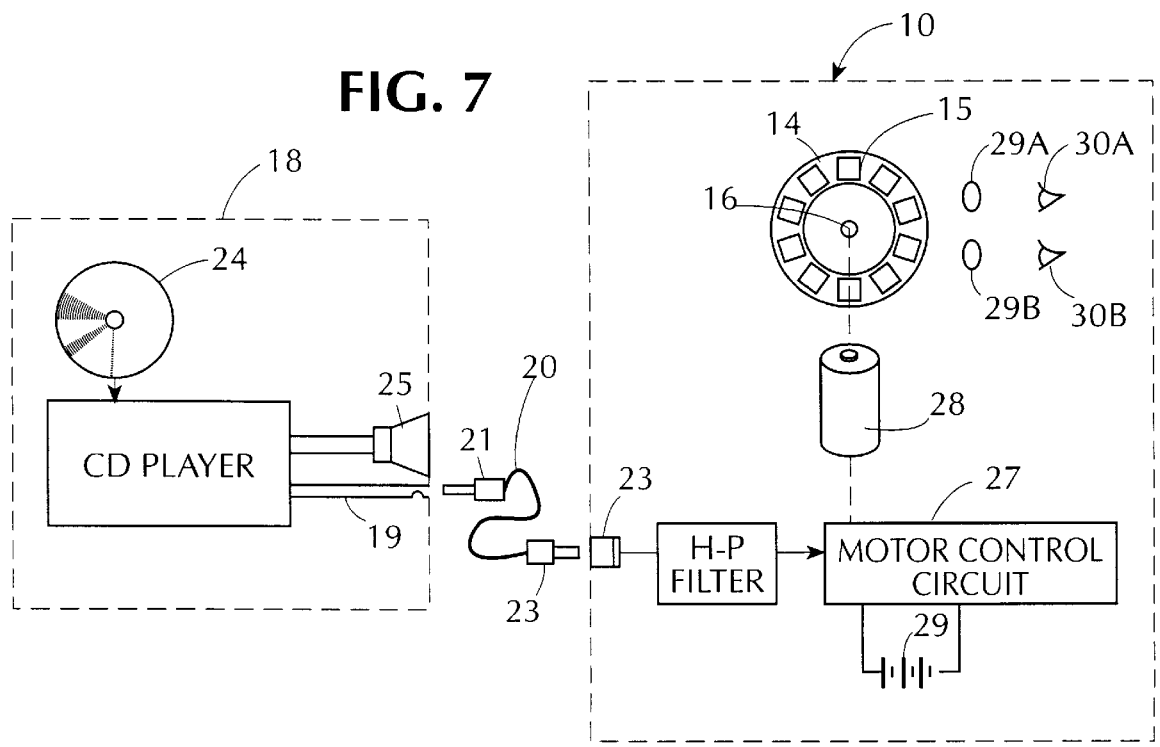
FIG. 7 is a block diagram of the operating mechanism of the audio-visual system, including the viewer unit shown in FIG. 3.

A standard CD player, as shown in FIG. 5 to permit other uses for the audio signal being fed to the loud speaker, also feeds this signal to an output jack 19. In a system in accordance with the invention, a cable 20 having a plug 21 at its trailing end and a plug 22 at its leading end serves to couple the output jack 19 of the CD player to an input jack 23 of the viewer unit, as shown in FIG. 7.

When a CD record 24 having a cue signal preceding each recording program in a series thereof, is inserted in the CD player, the audio output including the cue signals is fed both to a loud speaker 25 and to the output jack 19.

The cable 20 whose plug 21 is plugged into output jack 19 of the CD player and whose plug 22 is plugged into input jack 23 of the viewer unit 23, feeds the audio signals into a high-pass filter 26 which rejects the audio program signals and passes only the supersonic cue signals into a motor control circuit 27 which is preferably in a solid state form.

Motor control circuit 27 activates an electronic relay and governs the operation of a d-c stepping motor 28 which drives the View Master disc 14. Control circuit 27 is responsive to the supersonic cue signals applied thereto through filter 26, and functions to apply power from a battery 29 to the stepping motor.

Thus each time a cue signal is received, motor 28 is then activated to step disc 14 one frame at a time to a viewing position. At the viewing position the frame then in place can be seen through a pair of lenses 29A and 29B by the user whose eyes are covered by the mask section of the viewer unit.

At the outset of the operation of the system, a CD record 24 is inserted in the CD player 18 and a film frame disc 14 is inserted in the viewer unit 10. When the first cue signal is sent out by the player to the viewer unit in advance of program I, then stepping motor 28 is activated to advance the first film frame of the disc to the viewing position, and the film frame remains in this positon during playback of program I. When the next cue signal is sent out to again activate the stepping motor to advance the second film frame to the viewing position, the second frame is maintained in this position during play back of program II. This operation is repeated for the successive frames and programs.

The programs need not be of equal time duration, but the entire series thereof must have a duration not greater than the playing time or the CD record. In practice, the portable CD player may be strapped to the head of the user, or clipped onto a waist belt, so that the entire system is worn by the user.

The invention is not limited to CD players, for a standard magnetic tape cassette player may be used in conjunction with cassettes in which a supersonic cue signal precedes each recorded program in a series thereof.

Second Embodiment

In the first embodiment, the film storage device is constituted by a View Master disc having a circular array of film frames each having an image of a different subject.

Figure 3:
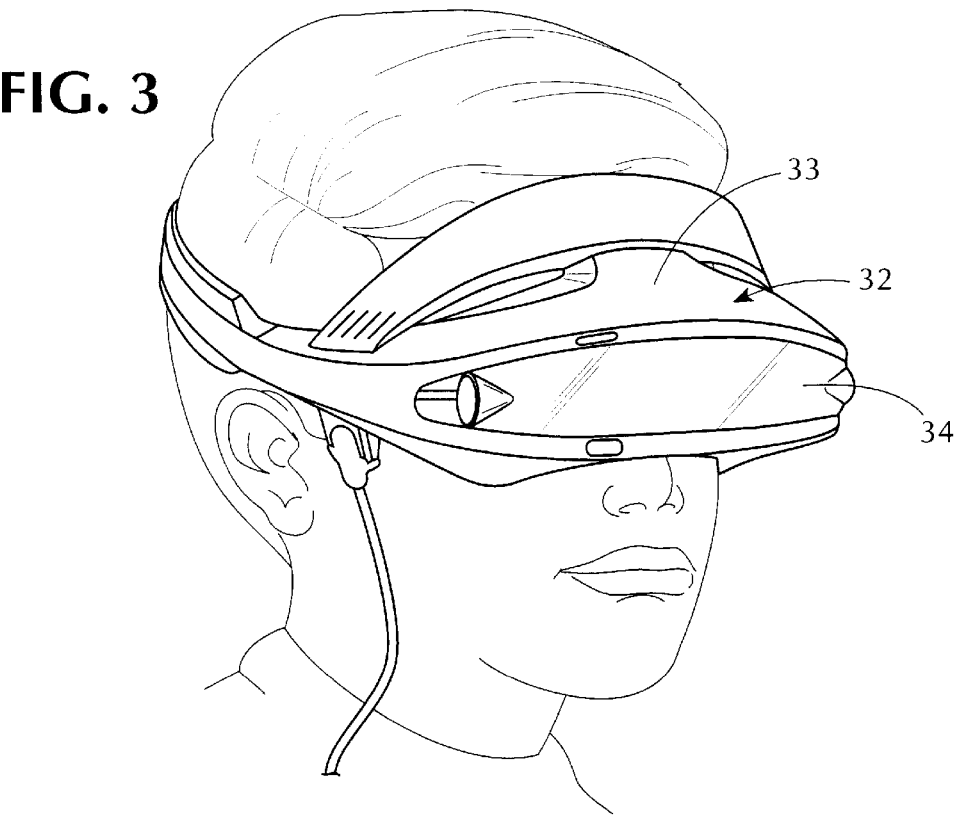
FIG. 3 illustrates another embodiment of a viewer unit.
Figure 4:
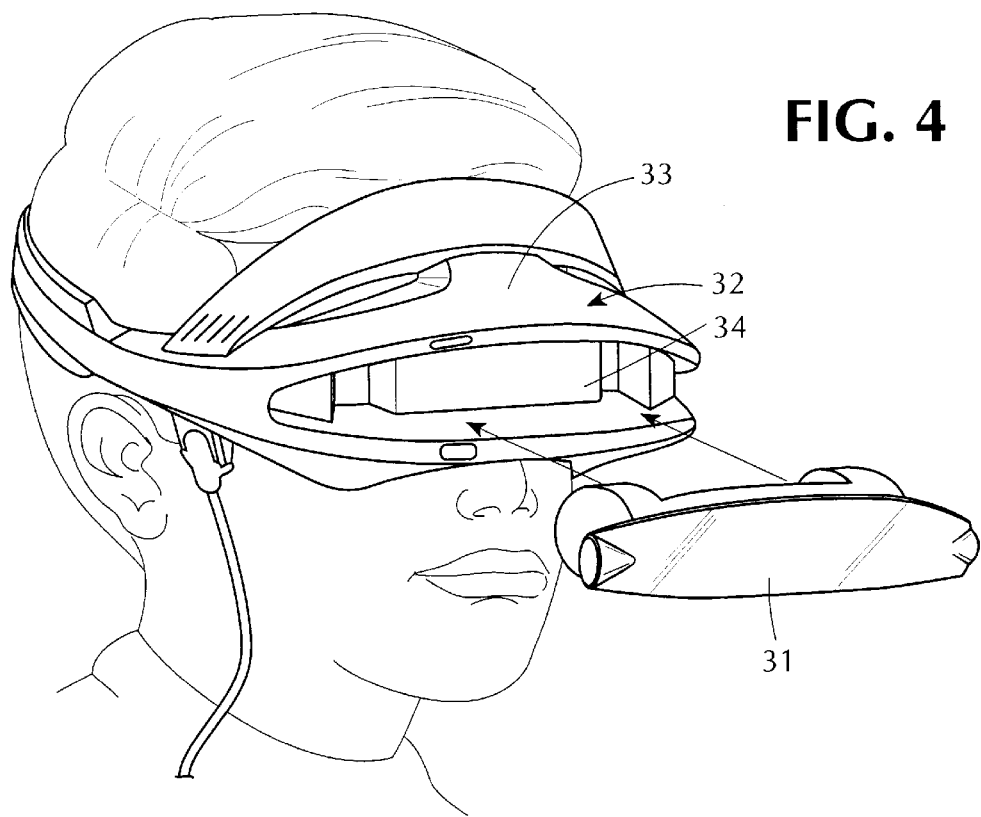
FIG. 4 shows a spool-to-spool cassette being inserted in the mask section of the FIG. 3 viewer unit.

In the second embodiment shown in FIGS. 3 and 4, the viewer unit 32 is adapted to operate in conjunction with a spool-to-spool film cassette 31. This is similar to that of a conventional "110" film cassette used in automatic cameras in which unexposed film from a supply spool is fed to a parallel take up spool which is motor driven so that each time a picture is taken to expose a film frame in line with the camera lens, the motor turns the take-up spool to advance the next unexposed frame to the picture-taking position.

In the present arrangement, the film in cassette 31 carries a series of different image frames, and the stepping motor in the viewer unit, when actuated, turns the take up spool to advance the frames successively to occupy the viewing position.

Viewer unit 32 is provided with straps when engage the head of the user to place the mask section 33 in a position covering the eyes. The mask section is provided with a socket 34 which accommodates cassette 31 and brings it into operative engagement with the stepping motor.

The film cassette frames can be arranged to afford stereoscopic vision. For this purpose, each image is defined by a pair of adjacent frames whose images are slightly displaced. But when the frames are separately viewed by the right and left eyes of the user, a stereoscopic image is then created. This limits the image capacity of the cassette, for it can only carry half as many images as a cassette carrying monoscopic images.

Since many CD records provide stereophonic sound, when used in conjunction with stereoscopic slide images, the resultant audio-visual system affords enhanced virtual-reality effects.

A significant advantage of a system in accordance with the invention is that the CD or other record player is a standard player that is already in the possession of the user of the system. Hence, all the user need acquire in a viewer unit and the necessary software: that is, CD records whose recordings take the form of a series of programs each preceded by a cue signal, and film storage devices for use with the viewer unit having a series of images, each image being that of a subject to which a corresponding program in the sound record is related.

When there have been shown and described preferred embodiments of a system in accordance with the invention, it will be appreciated that many changes and modifications may be made thereon without departing from the essencial spirit of the invention.

I claim:

1. An audio-visual system which makes it possible for a user to see during successive time periods a still image of a particular subject while listening to a program related thereto; said system comprising:

a. an audio-record player having a loud speaker and an output jack to which are both fed signals derived from the record being played;

b. a record to be played by the player having a recording thereof of a series of programs producing signals that lie in the sonic range, each related to a different subject, each program being preceded by a cue signal recording that lies in a range outside the sonic range; and c. a viewer unit for successively presenting to the eyes of the user at a viewing position a series of a film frames, each having an image of a subject corresponding to a subject in a respective program in the recording, said unit including a stepping motor responsive only to each cue signal yielded at the output jack to advance to the viewing position, the image frames being supported in a circular disc that is rotated by the stepping motor, said stepping motor being provided with a control circuit having an input jack coupled to the output jack of the player through a high-pass filter that rejects the sonic signals and passes said cue signals, said control circuit supplying operating power activating said motor each time said cue signal is received thereby, said high-pass filter being interposed between the input jack and the control circuit to reject signals in the audio range and to pass the supersonic cue signals, said viewing unit being provided with the straps so as to be supported on the head of the user.

2. A system as set forth in claim 1, in which the player is a compact disc player.

3. A system as set forth in claim 1 in which the player is a magnetic tape cassette player.

* * * * *